(12) United States Patent
Jia

(10) Patent No.: US 11,601,871 B2
(45) Date of Patent: Mar. 7, 2023

(54) DATA CONNECTION ESTABLISHMENT METHOD AND TERMINAL DEVICE

(71) Applicant: Huawei Technologies Co., Ltd., Shenzhen (CN)

(72) Inventor: Yanhong Jia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/337,182

(22) PCT Filed: Nov. 2, 2016

(86) PCT No.: PCT/CN2016/104369
§ 371 (c)(1),
(2) Date: Mar. 27, 2019

(87) PCT Pub. No.: WO2018/058737
PCT Pub. Date: Apr. 5, 2018

(65) Prior Publication Data
US 2019/0357124 A1 Nov. 21, 2019

(30) Foreign Application Priority Data

Sep. 27, 2016 (CN) .......................... 201610857120.2

(51) Int. Cl.
*H04W 48/16* (2009.01)
*H04W 8/18* (2009.01)
(Continued)

(52) U.S. Cl.
CPC .............. *H04W 48/16* (2013.01); *H04W 8/18* (2013.01); *H04W 48/18* (2013.01); *H04W 76/10* (2018.02)

(58) Field of Classification Search
CPC ....... H04W 48/16; H04W 76/10; H04W 8/18; H04W 48/18
See application file for complete search history.

(56) References Cited

U.S. PATENT DOCUMENTS

2004/0266435 A1\* 12/2004 de Jong ................ H04W 36/14
455/436
2008/0153484 A1 6/2008 Boni et al.
(Continued)

FOREIGN PATENT DOCUMENTS

CN 103813295 A \* 5/2014
CN 104581929 A 4/2015
(Continued)

OTHER PUBLICATIONS

Machine Translation and Abstract of Chinese Publication No. CN104581929, Apr. 29, 2015, 15 pages.
(Continued)

*Primary Examiner* — Kwang B Yao
*Assistant Examiner* — Xuan Lu
(74) *Attorney, Agent, or Firm* — Conley Rose, P.C.

(57) ABSTRACT

A data connection establishment method and a terminal device, where the method includes receiving, by an application processor (AP), a switch-on instruction, sending, by the AP, a network searching instruction to a communications processor (CP), where the network searching instruction instructs the CP to search for a network, receiving, by the AP, subscriber identity module (SIM) card status change information and network status change information from the CP, and sending, by the AP, a data connection establishment instruction to the CP based on the SIM card status change information and the network status change information, where the data connection establishment instruction instructs the CP to establish a data connection to the found network.

20 Claims, 9 Drawing Sheets

(51) Int. Cl.
*H04W 76/10* (2018.01)
*H04W 88/02* (2009.01)
*H04W 48/18* (2009.01)

(56) References Cited

U.S. PATENT DOCUMENTS

| | | | |
|---|---|---|---|
| 2009/0073871 A1 | 3/2009 | Ko et al. | |
| 2009/0163245 A1* | 6/2009 | Oozeki | H04W 8/183 455/558 |
| 2010/0022242 A1* | 1/2010 | Nizri | H04W 60/04 455/435.2 |
| 2010/0304782 A1* | 12/2010 | Chang | H04W 8/183 455/552.1 |
| 2011/0207453 A1* | 8/2011 | Hsu | H04W 88/06 455/424 |
| 2012/0282924 A1* | 11/2012 | Tagg | H04W 4/02 455/432.1 |
| 2013/0262927 A1* | 10/2013 | Chen | H04W 8/00 714/23 |
| 2013/0290700 A1* | 10/2013 | Davis | H04L 63/0428 713/153 |
| 2014/0031022 A1* | 1/2014 | Sen | H04W 8/22 455/418 |
| 2014/0105199 A1 | 4/2014 | Tian | |
| 2014/0143572 A1 | 5/2014 | Horiuchi et al. | |
| 2014/0344620 A1* | 11/2014 | Ma | G06F 11/1441 714/24 |
| 2015/0087306 A1 | 3/2015 | Wang et al. | |
| 2015/0146250 A1 | 5/2015 | Okada | |
| 2016/0173239 A1* | 6/2016 | Kim | H04L 1/1812 370/329 |
| 2016/0183177 A1* | 6/2016 | Ni | H04W 48/16 455/434 |
| 2016/0330600 A1* | 11/2016 | Abbott | H04W 4/16 |
| 2017/0086101 A1* | 3/2017 | Liu | H04W 76/10 |
| 2017/0366962 A1* | 12/2017 | Kim | H04W 8/18 |
| 2018/0062853 A1* | 3/2018 | Li | H04L 63/0876 |

FOREIGN PATENT DOCUMENTS

| | | |
|---|---|---|
| CN | 104902524 A | 9/2015 |
| CN | 105722188 A | 6/2016 |
| CN | 105792323 A | 7/2016 |
| CN | 105898828 A | 8/2016 |
| EP | 2046086 A1 | 4/2009 |
| JP | 2003125076 A | 4/2003 |
| JP | 2010514317 A | 4/2010 |
| JP | 2014099125 A | 5/2014 |
| JP | 2014525177 A | 9/2014 |
| JP | 2015515187 A | 5/2015 |
| JP | 2015103206 A | 6/2015 |
| JP | 2016045651 A | 4/2016 |
| JP | 2016524827 A | 8/2016 |
| WO | 2014170682 A1 | 10/2014 |

OTHER PUBLICATIONS

Machine Translation and Abstract of Chinese Publication No. CN105722188, Jun. 29, 2016, 9 pages.
Machine Translation and Abstract of Chinese Publication No. CN105898828, Aug. 24, 2016, 17 pages.
Foreign Communication From A Counterpart Application, PCT Application No. PCT/CN2016/104369, English Translation of International Search Report dated Jun. 7, 2017, 2 pages.
Foreign Communication From A Counterpart Application, PCT Application No. PCT/CN2016/104369, English Translation of Written Opinion dated Jun. 7, 2017, 4 pages.
Foreign Communication From A Counterpart Application, European Application No. 16917484.4, Extended European Search Report dated Sep. 2, 2019, 10 pages.

* cited by examiner

DATA CONNECTION ESTABLISHMENT METHOD AND TERMINAL DEVICE

CROSS-REFERENCE TO RELATED APPLICATIONS

This application is a U.S. National Stage of International Patent Application No. PCT/CN2016/104369 filed on Nov. 2, 2016, which claims priority to Chinese Patent Application No. 201610857120.2 filed on Sep. 27, 2016. Both of the aforementioned applications are hereby incorporated by reference in their entireties.

TECHNICAL FIELD

The present invention relates to the field of communications technologies, and in particular, to a data connection establishment method and a terminal device.

BACKGROUND

Currently, mobile terminal devices such as a mobile phone and a tablet computer are playing an increasingly important role in people's life. While people work and are entertained by using these mobile devices, a higher requirement is made on user experience, for example, to quickly find a network after switch-on, to use a data service.

A terminal device such as a smartphone is usually based on an architecture including an application processor (Application Processor, AP) and a communications processor (Communication Processor, CP). The AP implements interaction with a user, and the AP is configured to: read data of a SIM card and data of a network and display the data to the user. In addition, the AP forwards a request of the user to the SIM card or the network. The CP implements interaction with the subscriber identity module (Subscriber Identity Module, SIM) card and the network.

In the prior art, during each switch-on, the CP needs to wait for startup of the AP. In addition, after the AP receives a SIM card status change, radio status information, and network status change information that are sent by the CP, the AP then sends a network searching command to the CP by using a radio interface layer (Radio Interface Layer, RIL). The CP receives the network searching command and starts to search for a network. The SIM card status change information and the network status change information are respectively used to indicate that the AP can send, to the CP, an instruction for querying information about a SIM card and an instruction for querying network registration information. The radio status information indicates that the CP has not received a network searching instruction. Moreover, in the prior art, the AP needs to create an access point name (Access Point Name, APN) based on a mobile country code (Mobile Country Code, MCC) and a mobile network code (Mobile Network Code, MNC) of the SIM card after completing reading of all the information about the SIM card, so that the CP creates a data connection to a network based on the APN. Because different read rates of different SIM cards cause a relatively great difference between times for reading the cards, the AP needs to create the APN after completing reading of the information about the SIM card, and the AP needs to send a network searching instruction to the CP after the CP sends related information. Consequently, a time for waiting for establishment of a data connection by a user is relatively long, and a user-centered experience requirement cannot be met.

Therefore, a current mechanism for establishing a data connection after switch-on of a terminal device needs to optimized, to provide quicker and better experience for a user.

SUMMARY

Embodiments of the present invention relate to a data connection establishment method and a terminal device, to resolve a prior-art problem that a time for establishing a data connection is relatively long.

According to a first aspect, an embodiment of the present invention provides a data connection establishment method. The method includes: receiving, by an application processor AP, a switch-on instruction; sending, by the AP, a network searching instruction to a communications processor CP, where the network searching instruction is used to instruct the CP to search for a network; receiving, by the AP, SIM card status change information and network status change information that are sent by the CP; and sending, by the AP, a data connection establishment instruction to the CP based on the SIM card status change information and the network status change information, where the data connection establishment instruction is used to instruct the CP to establish a data connection to the found network.

In this embodiment of the present invention, the CP receives the network searching instruction in advance and starts to search for a network, thereby advancing time at which a data service PS is successfully registered, and shortening a time for waiting for establishment of the data service by a user.

It should be noted that, after the AP sends the network searching instruction to the CP, the AP receives the SIM card status change information and the network status change information that are sent by the CP. Time at which the AP sends a network searching instruction to the CP is advanced, to advance time at which PS is attached. Successfully registering the PS may also be referred to as PS attached.

In a possible implementation, the network searching instruction is further used to instruct the CP to register a data service PS with the found network based on information about a subscriber identity module SIM card, and when the PS is successfully registered, the PS of the CP is attached; the sending, by the AP, a data connection establishment instruction to the CP based on the SIM card status change information and the network status change information, where the data connection establishment instruction is used to instruct the CP to establish a data connection to the found network includes: determining, by the AP, a mobile country code MCC and a mobile network code MNC of the SIM card based on the SIM card status change information; determining, by the AP based on the network status change information, that the PS of the CP is attached; and sending, by the AP, the data connection establishment instruction to the CP based on the MCC and the MNC, where the data connection establishment instruction is used to instruct the CP to establish a data connection to the found network.

In this embodiment of the present invention, a speed of reading the SIM card is optimized, thereby shortening a time for creating a data connection, and reducing a time for waiting for establishment of a data service by a user on the whole.

In a possible implementation, after the sending, by the AP, a network searching instruction to a communications processor CP, the method further includes: receiving, by the AP, radio status information sent by the CP, where the radio status information is used to indicate that the CP has started to search for a network.

In this embodiment of the present invention, because the CP receives the network searching instruction in advance, after searching for a network, the CP sets the radio status information as that the CP has started to search for a network. The AP receives the radio status information, and no longer sends a network searching instruction to the CP.

In a possible implementation, the determining, by the AP, a mobile country code MCC and a mobile network code MNC of the SIM card based on the SIM card status change information includes: sending, by the AP to the CP based on the SIM card status change information, an instruction for querying the information about the SIM card; receiving, by the AP, the information about the SIM card sent by the CP; and obtaining, by the AP, the MCC and the MNC of the SIM card from the information about the SIM card.

In a possible implementation, the determining, by the AP based on the network status change information, that the PS of the CP is attached includes: sending, by the AP to the CP based on the network status change information, an instruction for querying network registration information; receiving, by the AP, the network registration information returned by the CP; and determining, by the AP based on the network registration information, that the PS of the CP is attached.

In a possible implementation, the method further includes: obtaining, by the AP from the information about the SIM card, a serial number, a local phone number, a voice mailbox identifier, a call transfer identifier, and operator name information of the SIM card; and the sending, by the AP, the data connection establishment instruction to the CP based on the MCC and the MNC includes: creating, by the AP, an access point name APN based on the MCC and the MNC, so that the CP establishes a data connection to the found network based on the APN, where the obtaining, by the AP from the information about the SIM card, a serial number, a local phone number, a voice mailbox identifier, a call transfer identifier, and operator name information of the SIM card and the creating, by the AP, the APN based on the MCC and the MNC are performed in parallel.

It should be noted that, during establishment of a data connection, the AP needs to create a corresponding access point name APN based on an MNC and an MCC, and the CP creates a data connection to a network based on the APN. Therefore, after reading the MCC and the MNC from information about a SIM card, the AP can create the APN based on the MCC and the MNC, and the AP reads a serial number, a local phone number, a voice mailbox identifier, a call transfer identifier, and operator name information of the SIM card and that are in the information about the SIM card, so that the CP establishes a data connection to the network based on the APN. The APN is created without waiting for the AP to complete reading of all the information about the SIM card. Therefore, time at which an APN is created is advanced, and a waiting time of a user is reduced.

Specifically, in this embodiment of the present invention, that the AP sends the data connection establishment instruction to the CP needs to meet two conditions. One condition is that the AP completes creation of the APN based on the MCC and the MNC. The other condition is that the AP determines that the PS is attached. In this embodiment of the present invention, time at which PS is attached and time at which an APN is created are advanced through designing. Therefore, a time for waiting for creation of a data connection is shortened, and user experience is improved.

According to a second aspect, an embodiment of the present invention provides another data connection establishment method. The method includes: receiving, by a communications processor CP, a network searching instruction, where the network searching instruction is used to instruct the CP to search for a network; searching for, by the CP, the network; sending, by the CP, SIM card status change information and network status change information to an application processor AP, where the SIM card status change information and the network status change information are used by the AP to send a data connection establishment instruction to the CP and establishing, by the CP, a data connection to the found network.

In a possible implementation, after the CP searches for a network, and registers a data service with the found network based on information about the SIM card, the method further includes: sending, by the CP, radio status information to the AP, where the radio status information is used to indicate that the CP has started to search for a network.

According to a third aspect, an embodiment of the present invention provides a data connection establishment method. The method includes: receiving, by an application processor AP, a switch-on instruction; obtaining, by the AP, a mobile country code MCC and a mobile network code MNC of a subscriber identity module SIM card from information about the SIM card; obtaining, by the AP from the information about the SIM card, a serial number, a local phone number, a voice mailbox identifier, a call transfer identifier, and operator name information of the SIM card; creating, by the AP, an access point name APN based on the MCC and the MNC, where the obtaining, by the AP from the information about the SIM card, a serial number, a local phone number, a voice mailbox identifier, a call transfer identifier, and operator name information of the SIM card and the creating, by the AP, the APN based on the MCC and the MNC are performed in parallel; and sending, by the AP, a data connection establishment instruction to a communications processor CP, so that the CP establishes a data connection to the found network based on the APN.

In a possible implementation, after the receiving, by an application processor AP, a switch-on instruction, the method further includes: sending, by the AP, a network searching instruction to the CP, where the network searching instruction is used to instruct the CP to search for a network; receiving, by the AP, SIM card status change information and network status change information that are sent by the CP; the obtaining, by the AP, a mobile country code MCC and a mobile network code MNC of a subscriber identity module SIM card from information about the SIM card includes: sending, by the AP to the CP based on the SIM card status change information, an instruction for querying the information about the SIM card; receiving, by the AP, the information about the SIM card sent by the CP; and obtaining, by the AP, the MCC and the MNC of the SIM card from the information about the SIM card; and the sending, by the AP, a data connection establishment instruction to the CP includes: sending, by the AP, the data connection establishment instruction to the CP after the AP determines, based on the network status change information, that the CP successfully registers a data service PS.

According to a fourth aspect, an embodiment of the present invention provides a terminal device. The terminal device includes: an application processor AP and a communications processor CP, and the AP is connected to the CP by using a communications bus; the AP is configured to receive a switch-on instruction; the AP is further configured to send a network searching instruction to the CP; the CP is configured to search for a network based on the network searching instruction; the AP is further configured to receive SIM card status change information and network status change information that are sent by the CP; the AP is further configured to send a data connection establishment instruction to the CP based on the SIM card status change information and the network status change information; and the CP is configured to establish a data connection to the found network.

In a possible implementation, the CP is further configured to register a data service PS with the found network based on the network searching instruction and information about a subscriber identity module SIM card, and when the PS is successfully registered, the PS of the CP is attached; the AP is specifically configured to: send the data connection establishment instruction to the CP based on the SIM card status change information and the network status change information, determine, based on the network status change information, that the PS of the CP is attached, and send the data connection establishment instruction to the CP; and the CP is specifically configured to establish a data connection to the found network based on the data connection establishment instruction, the MCC, and the MNC.

In a possible implementation, the AP is further configured to receive radio status information sent by the CP, where the radio status information is used to indicate that the CP has started to search for a network.

In a possible implementation, the AP is specifically configured to: send, to the CP based on the SIM card status change information, an instruction for querying the information about the SIM card, receive the information about the SIM card sent by the CP, and obtain the MCC and the MNC of the SIM card from the information about the SIM card.

In a possible implementation, the AP is specifically configured to: send, to the CP based on the network status change information, an instruction for querying network registration information, receive the network registration information returned by the CP, and determine, based on the network registration information, that the PS of the CP is attached.

In a possible implementation, the AP is further configured to obtain, from the information about the SIM card, a serial number, a local phone number, a voice mailbox identifier, a call transfer identifier, and operator name information of the SIM card; and the AP is specifically configured to create an access point name APN based on the MCC and the MNC, so that the CP establishes a data connection to the found network based on the APN, where the obtaining, by the AP from the information about the SIM card, a serial number, a local phone number, a voice mailbox identifier, a call transfer identifier, and operator name information of the SIM card and the creating, by the AP, the APN based on the MCC and the MNC are performed in parallel.

According to a fifth aspect, an embodiment of the present invention provides another terminal device. The terminal device includes: an application processor AP and a communications processor CP, and the AP is connected to the CP by using a communications bus; the CP is configured to receive a network searching instruction; the CP is further configured to search for a network based on the network searching instruction; the CP is further configured to send SIM card status change information and network status change information to the AP; the AP is configured to send a data connection establishment instruction to the CP based on the SIM card status change information and the network status change information; and the CP is further configured to establish a data connection to the found network based on the data connection establishment instruction.

In a possible implementation, after the CP searches for a network, the CP is further configured to send radio status information to the AP, where the radio status information is used to indicate that the CP has started to search for a network.

According to a sixth aspect, an embodiment of the present invention provides another terminal device. The terminal device includes: an application processor AP and a communications processor CP, and the AP is connected to the CP by using a communications bus; the AP is configured to receive a switch-on instruction; the AP is further configured to obtain a mobile country code MCC and a mobile network code MNC of a subscriber identity module SIM card from information about the SIM card; the AP is further configured to obtain, from the information about the SIM card, a serial number, a local phone number, a voice mailbox identifier, a call transfer identifier, and operator name information of the SIM card; the AP is further configured to create an access point name APN based on the MCC and the MNC, where the obtaining, by the AP from the information about the SIM card, a serial number, a local phone number, a voice mailbox identifier, a call transfer identifier, and operator name information of the SIM card and the creating, by the AP, the APN based on the MCC and the MNC are performed in parallel; and the AP is further configured to send a data connection establishment instruction to the CP, so that the CP establishes a data connection to the found network based on the APN.

In a possible implementation, after the application processor AP receives the switch-on instruction, the AP is further configured to: send a network searching instruction to the CP, where the network searching instruction is used to instruct the CP to search for a network, and receive SIM card status change information and network status change information that are sent by the CP; the AP is specifically configured to: send, to the CP based on the SIM card status change information, an instruction for querying the information about the SIM card; receive, by the AP, the information about the SIM card sent by the CP; and obtain, by the AP, the MCC and the MNC of the SIM card from the information about the SIM card; and the AP is specifically configured to send the data connection establishment instruction to the CP after determining, based on the network status change information, that the CP successfully registers a data service PS.

Based on the foregoing technical solutions, according to the data connection establishment method and the terminal device that are provided in the embodiments of the present invention, the CP receives the network searching instruction in advance and starts to search for a network, thereby advancing time at which PS is attached, and shortening a time for waiting for establishment of the data service by a user. In addition, in the embodiments of the present invention, further, time at which an APN is created is advanced. Therefore, a time for establishing a data connection is further shortened, a time for the user to use the data service is greatly shortened, and user experience is improved.

DESCRIPTION OF EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some rather than all of the embodiments of the present invention. All other embodiments obtained by persons of ordinary skill in the art based on the embodiments of the present invention without creative efforts shall fall within the protection scope of the present invention.

Network architectures and services scenarios described in the embodiments of the present invention aim to more clearly describe the technical solutions in the embodiments of the present invention, but are not intended to limit the technical solutions provided in the embodiments of the present invention. Persons of ordinary skill in the art may know that as the network architectures evolve and a new business scenario emerges, the technical solutions provided in the embodiments of the present invention are further applicable to a similar technical problem.

Figure 1:
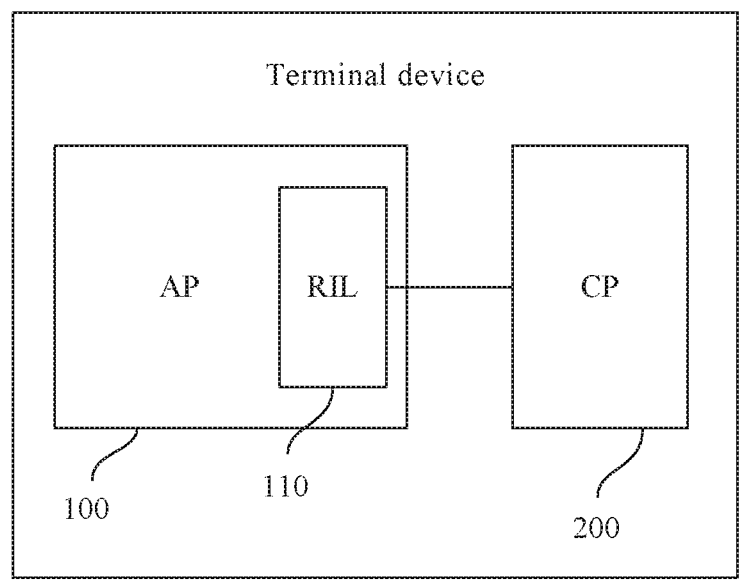
FIG. 1 is a schematic architectural diagram of a terminal device according to an embodiment of the present invention.

FIG. 1 is a schematic architectural diagram of a terminal device according to an embodiment of the present invention. As shown in FIG. 1, the terminal device includes an AP 100 and a CP 200. The AP 100 is connected to the CP 200 by using a communications bus. A RIL 110 is a software interface establishing communication between the AP 100 and the CP 200. The RIL 110 may function as a part of the AP 100. Alternatively, the RIL 110 may function as a part of the CP 200. In addition, alternatively, the RIL 110 may function as an independent part. For brief description, in this embodiment of the present invention, the RIL 110 is used as a part of the AP 100 for description.

In the terminal device provided in this embodiment of the present invention, the CP implements an entire network communications protocol stack. For example, data, network searching, a call, a short message service, a SIM card, a supplementary service, and the like are all specifically implemented on the CP, and the CP implements signaling interaction with a network. The AP completes a function of reading information about the SIM card and network data, and displays the information about the SIM card and the network data to a user. In addition, the AP implements a function of interacting with the user, and forwards a request of the user to a network or the SIM card. The RIL is the software interface connecting the AP and the CP, is responsible for communication between the AP and the CP, and is specifically configured to: send, to the CP, a request command such as a query request command or a setting request command that is delivered by the AR and return, to the AP, an unsolicited report command of the CP or a response to the request command of the AP.

Figure 2A:
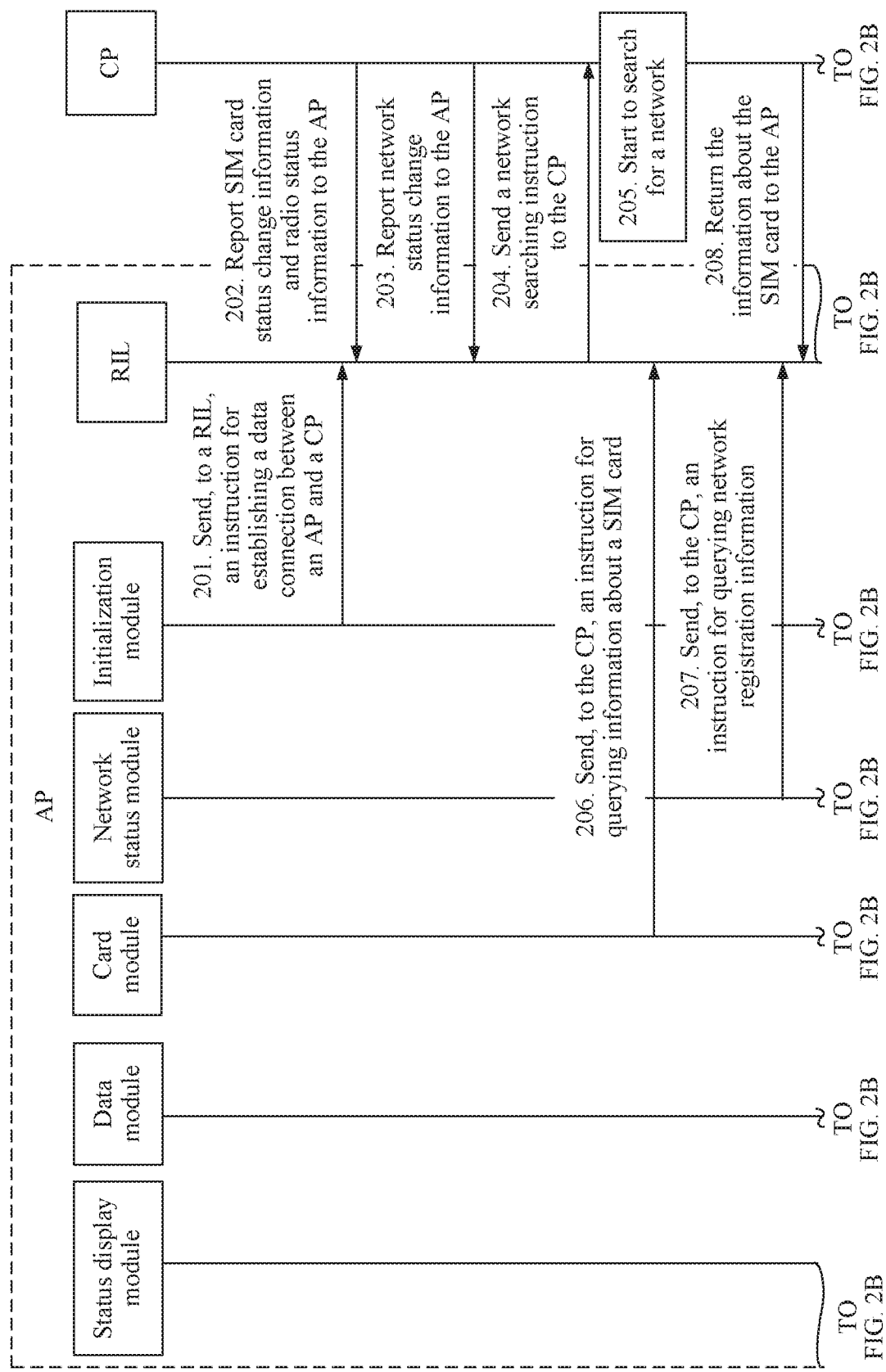
FIG. 2A and FIG. 2B are an existing signaling interaction diagram of establishing a data connection.
Figure 2B:
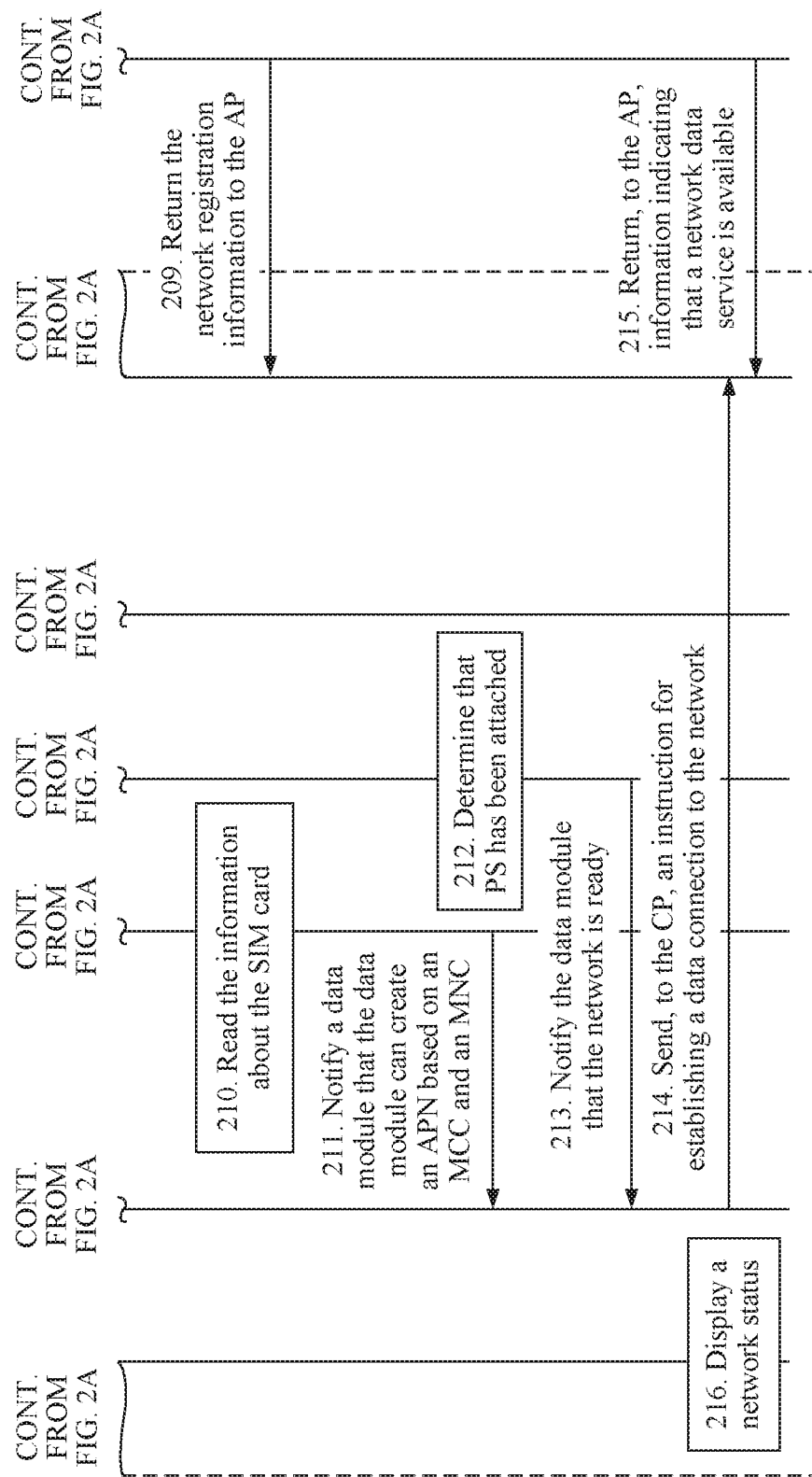

FIG. 2A and FIG. 2B are an existing signaling interaction diagram of establishing a data connection. As shown in FIG. 2A and FIG. 2B, after an AP receives a switch-on instruction, in step 201, a RIL creates a data connection between the AP and a CP based on an instruction that is sent by an initialization module in the AP and that is for creating a data connection between the AP and the CP. Step 202: The CP reports SIM card status change information and radio status information to the AP. Step 203: The CP reports network status change information to the AP. The SIM card status change information and the network status change information are respectively used to indicate that the AP can send, to the CR an instruction for querying information about a SIM card and an instruction for querying network registration information. The radio status information indicates that the CP has not received a network searching instruction. Step 204: After the AP receives the radio status information, the AP sends the network searching instruction to the CR Step 205: The CP searches for a network. The AP reads the found information about the SIM card and the found network registration information, and determines, based on the information about the SIM card and the network registration information, whether to send a data connection establishment instruction to the CP. Specifically, in step 210, a card module reads all the information about the SIM card. Step 211: The card module notifies a data module that the data module can create a data APN based on an MCC and an MNC of the SIM card.

Figure 4A:
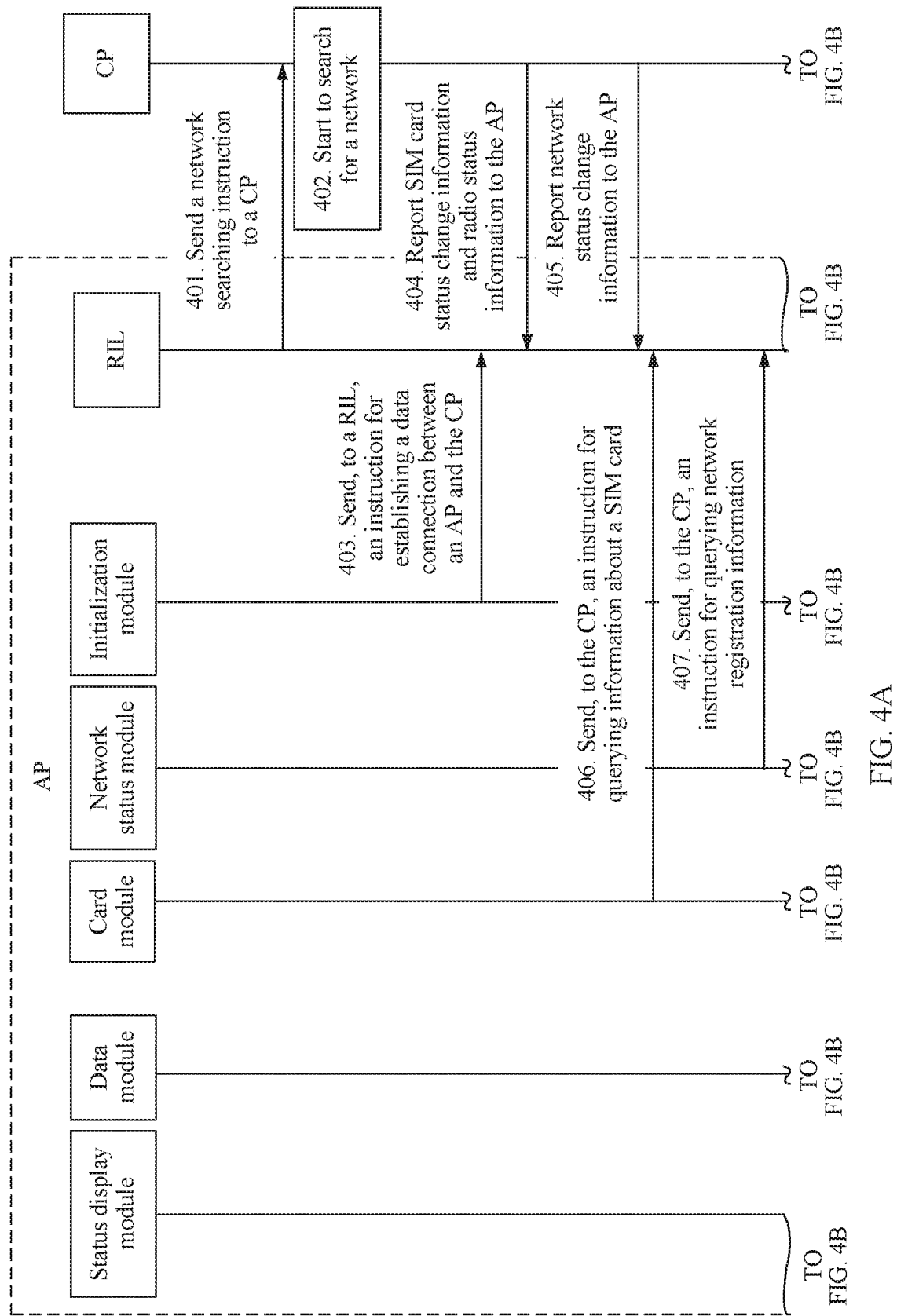
FIG. 4A and FIG. 4B are a schematic diagram of another data connection establishment method and an apparatus according to an embodiment of the present invention.
Figure 4B:
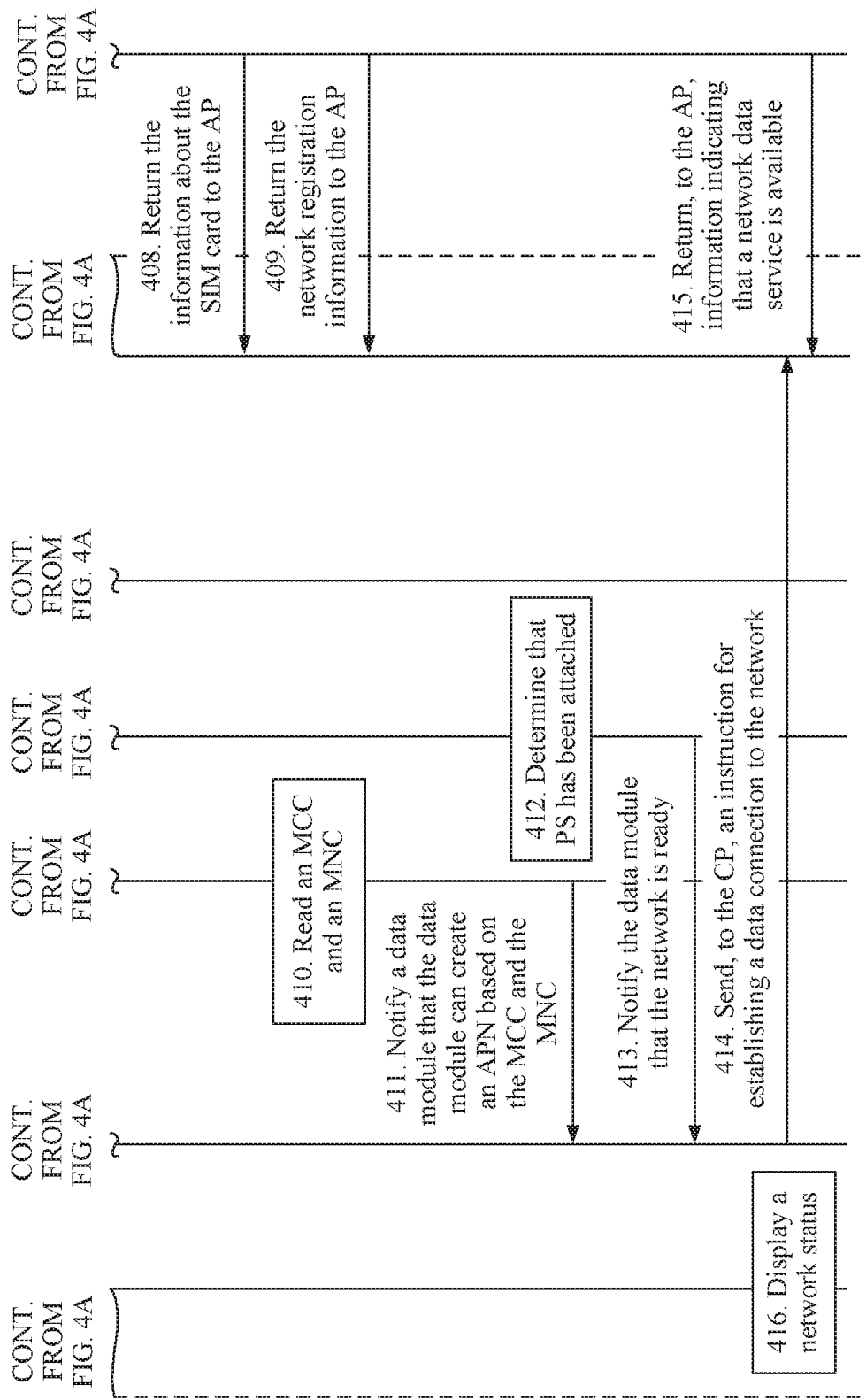

Specifically, for functions of the modules included in the AP in FIG. 2A and FIG. 2B, refer to descriptions in FIG. 4A and FIG. 4B. For step 206 to step 209 and step 212 to step 216, respectively refer to detailed descriptions in step 406 to step 409 and step 412 to step 416 in FIG. 4A and FIG. 4B. Steps of main parts different from FIG. 4A and FIG. 4B are first described herein, to facilitate understanding of this embodiment of the present invention.

In the prior art, a terminal device receives a switch-on instruction, to correspondingly start up the AP and the CP. After being started up, the AP establishes a connection to the CP by using the RIL. The CP reports the SIM card status change information, the radio status information, and the network status change information to the AP by using the RIL. The radio status information is used to indicate whether the CP has received the network searching instruction (whether the CP has started to search for a network). In the prior art, the radio status information indicates that the CP has not started to search for a network. Then, the AP sends the network searching instruction to the CP by using the RIL, and the CP searches for a network and performs registration. This is shown in step 202 to step 205.

A terminal device provided in the embodiment of the present invention receives a switch-on instruction, and after a RIL is started up, sends a network searching instruction to a CP without waiting for the CP to report SIM card status change information, radio status information, and network status change information to an AP. The CP searches for a network and performs registration, so that time at which the CP searches for a network is advanced. In a possible example, the CP may find a plurality of networks, and the CP arranges priorities of the plurality of found networks based on information about a SIM card, and selects a network having a highest priority thereof for registration.

For the terminal device provided in the embodiment of the present invention, after the CP receives the network searching instruction, the CP reports the SIM card status change information, the radio status information, and the network status change information to the AP by using the RIL. In the embodiment of the present invention, the radio status information indicates that the CP has started to search for a network. The SIM card status change information and the network status change information are used to indicate that the AP can send, to the CP, an instruction for querying the information about the SIM card and an instruction for querying network registration information. The AP determines, based on the found information about the SIM card and the found network registration information, whether to send a data connection establishment instruction to the CP, to establish a data connection to a network by using the CP. Specifically, in the embodiment of the present invention, the RIL functions as a part of the AP. It can be intuitively learned that, after the AP receives the switch-on instruction, time at which the AP sends a network searching instruction to the CP is advanced compared with that in the prior art.

Further, the AP sends the data connection establishment instruction to the CP based on the SIM card status change information and the network status change information that are reported by the CP, and the CP establishes a data connection to the found network based on the data connection establishment instruction.

It should be noted that, that the CP searches for a network and performs registration indicates that the CP registers a data service/packet switched (Packet Switched, PS) and a voice service/circuit switched (Circuit Switched, CS) to the network based on the information about the SIM card and information about the found network. A time from receiving, by the terminal device, the network searching instruction to completing PS registration is a time in which PS is attached. In the prior art, the AP sends the network searching instruction to the CP after the AP receives the SIM card status change information, the radio status information, and the network status change information that are sent by the CP. Different from that, in the embodiment of the present invention, after switch-on, the CP first receives the network searching instruction sent by the AP. Therefore, for the terminal device provided in the embodiment of the present invention, the CP receives the network searching instruction in advance and starts to search for a network, thereby advancing the time at which PS is attached, and reducing a waiting time of a user.

When a data connection is established, the AP needs to create a corresponding APN based on an MNC and an MCC, and the CP creates a data connection to a network based on the APN. In the prior art, for example, in step 210, after obtaining all content in the information about the SIM card, the AP creates the APN. However, in the embodiment of the present invention, the AP can create the APN after obtaining the MCC and the MNC of the SIM card. In addition, the AP obtains a serial number, a local phone number, a voice mailbox identifier, a call transfer identifier, and operator name information of the SIM card and that are in the SIM card. In the prior art, the APN needs to be created based on the MCC and the MNC after all the information about the SIM card is read. However, in the embodiment of the present invention, the APN starts to be created after the MCC and the MNC are read. In the embodiment of the present invention, time at which an APN is created is advanced based on this design. In a possible test, it indicates that through a card reading optimization design in the present invention, the time at which an APN is created is advanced by 3s to 4s.

Therefore, further, for the terminal device provided in the embodiment of the present invention, after the AP receives the SIM card status change information and the network status change information that are sent by the CP, the AP sends, to the CP, the instruction for querying the information about the SIM card and the instruction for querying the network registration information, and the CP returns the information about the SIM card and the network registration information to the AP. When reading the mobile country code MCC and the mobile network code MNC in the information about the SIM card, the AP creates the APN based on the MCC and the MNC without waiting to read all the information about the SIM card, so that the CP may establish a data connection to a network based on the APN.

It should be noted that, in the prior art, whether PS is attached is verified after reading of the information about the SIM card is completed, and this is different from that in the embodiment of the present invention. However, in the embodiment of the present invention, after completing reading of information about the MCC and the MNC from the information about the SIM card, the AP creates the APN based on the MCC and the MNC. In addition, the AP reads the serial number, the local phone number, the voice mailbox identifier, the call transfer identifier, and the operator name information of the SIM card and that are in the SIM card. Therefore, after it is determined that PS is attached, the CP can initiate a data connection to the network based on the APN. In the embodiment of the present invention, a speed of reading the SIM card is optimized, thereby advancing time at which an APN is created. In addition, the AP normally reads all the information about the SIM card, thereby shortening a time for creating a data connection, and reducing a time for waiting for establishment of the data service by a user on the whole.

In the embodiment of the present invention, when the terminal device is switched on, a network searching instruction is sent to the CP in advance, thereby advancing time at which PS is attached. Moreover, the speed of reading the SIM card is optimized, thereby advancing time at which an APN is created, so that a user can quickly use a data service. The present invention has a desirable application prospect, and is applicable to a terminal device, such as a mobile phone or a tablet computer.

Figure 3:
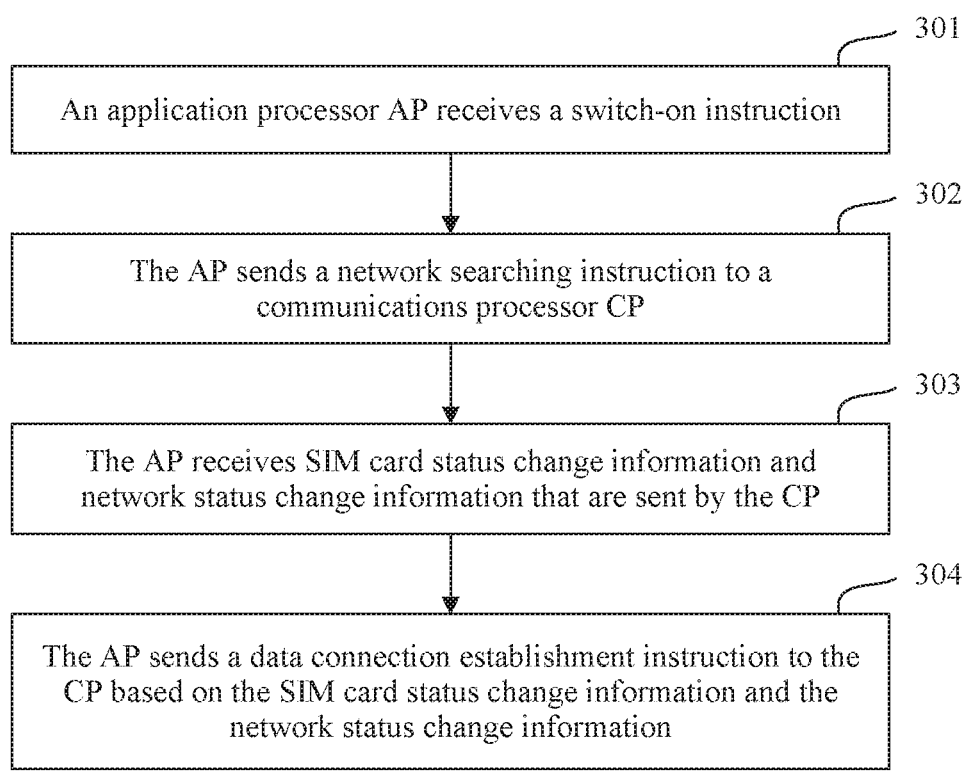
FIG. 3 is a schematic flowchart of a data connection establishment method according to an embodiment of the present invention.

FIG. 3 is a schematic flowchart of a data connection establishment method according to an embodiment of the present invention. The method is performed by an AP in a terminal device. As shown in FIG. 3, the method provided in this embodiment includes the following steps.

Step 301: The application processor AP receives a switch-on instruction.

Step 302: The AP sends a network searching instruction to a communications processor CP, where the network searching instruction is used to instruct the CP to search for a network.

Optionally, after the AP sends the network searching instruction to the communications processor CP, the method further includes: receiving, by the AP, radio status information sent by the CP, where the radio status information is used to indicate that the CP has started to search for a network.

Step 303: The AP receives SIM card status change information and network status change information that are sent by the CP.

The SIM card status change information is UNSOL_RESPONSE_SIM_STATUS_CHANGED, and the information is a command word reported by the CP in an unsolicited manner, and does not carry specific information. The information indicates that the AP can send, to the CP, an instruction for querying information about a SIM card.

The network status change information is UNSOL_RE-SPONSE_VOICE_NETWORK_STATE_CHANGED, and the information is a command word reported by the CP in an unsolicited manner, and does not carry specific information. The information indicates that the AP can send, to the CP, an instruction for querying network registration information.

Step 304: The AP sends a data connection establishment instruction to the CP based on the SIM card status change information and the network status change information, where the data connection establishment instruction is used to instruct the CP to establish a data connection to the found network.

Optionally, the network searching instruction is further used to instruct the CP to register a data service PS with the found network based on the information about the subscriber identity module SIM card, and when the PS is successfully registered, the PS of the CP is attached. That the AP sends a data connection establishment instruction to the CP based on the SIM card status change information and the network status change information, where the data connection establishment instruction is used to instruct the CP to establish a data connection to the found network includes: determining, by the AP, a mobile country code MCC and a mobile network code MNC of the SIM card based on the SIM card status change information; determining, by the AP based on the network status change information, that the PS of the CP is attached and sending, by the AP, the data connection establishment instruction to the CP based on the MCC and the MNC, where the data connection establishment instruction is used to instruct the CP to establish a data connection to the found network.

Optionally, the AP sends, to the CP based on the SIM card status change information, the instruction for querying the information about the SIM card. The AP receives the information about the SIM card sent by the CP. The AP obtains the MCC and the MNC of the SIM card from the information about the SIM card.

Optionally, the AP sends, to the CP based on the network status change information, an instruction for querying network registration information. The AP receives the network registration information returned by the CP. The AP determines, based on the network registration information, that the PS of the CP is attached.

Optionally, the AP obtains, from the information about the SIM card, a serial number, a local phone number, a voice mailbox identifier, a call transfer identifier, and operator name information of the SIM card. That the AP sends the data connection establishment instruction to the CP based on the MCC and the MNC includes: creating, by the AP, an access point name APN based on the MCC and the MNC, so that the CP establishes a data connection to the found network based on the APN. The obtaining, by the AP from the information about the SIM card, a serial number, a local phone number, a voice mailbox identifier, a call transfer identifier, and operator name information of the SIM card and the creating, by the AP, the APN based on the MCC and the MNC are performed in parallel.

It may be understood that the AP determines specific content in the information about the SIM by reading the information about the SIM card.

It should be noted that, in this embodiment of the present invention, after completing reading of information about the MCC and the MNC from the information about the SIM card, the AP creates the APN based on the MCC and the MNC. In addition, the AP continues reading the serial number, the local phone number, the voice mailbox identifier, the call transfer identifier, and the operator name information of the SIM card and that are in the information about the SIM card. Different from the prior art, the AP needs to wait to completing reading of all the information about the SIM card, thereby advancing time at which an APN is created. In this embodiment of the present invention, a speed of reading the card may be optimized, thereby advancing time at which an APN is created and time at which PS is attached, shortening a time for creating a data connection, and finally reducing a time for waiting for establishment of the data service by a user on the whole.

According to the data connection establishment method and the terminal device that are provided in this embodiment of the present invention, the AP does not need to wait to complete reading of all records of the SIM card, and creates the APN based on the MCC and the MNC as long as reading of the MCC and the MNC of the SIM card is completed. After it is determined that the PS is attached, the CP can be instructed to initiate a data connection based on the APN. In addition, because the CP is powered on in advance and starts to search for a network, time at which PS is attached is advanced. In this embodiment of the present invention, two conditions of establishing a data connection by the terminal device are optimized, thereby advancing time at which PS is attached and time at which an APN is created. A data connection can be initiated in advance, thereby greatly shortening a time for a user to use the data service.

It should be noted that, for the terminal device provided in this embodiment of the present invention, the AP can be further divided into a plurality of modules, such as a status display module, a data module, a card module, a network status module, an initialization module, and a RIL. In a possible example, the initialization module is mainly responsible for initializing each module, and establishing a connection between the AP and the CP by using the RIL. The network status module is mainly responsible for listening to a change in a network registration status, and providing an interface related to querying or an interface related to setting network registration; and when the network registration status changes, notifying a latest found status to all registered modules and modules for which callback is performed. The card module is mainly responsible for listening to a change in a status of the SIM card, and when there is a change, querying the status of the SIM card and notifying all the registered modules and the modules for which callback is performed. The data module is mainly responsible for a related operation such as a data connection or a data disconnection, and providing a related interface for querying a current data connection status; and when the data connection status changes, notifying all the registered modules and the modules for which callback is performed. The status display module is mainly responsible for displaying the network registration status (such an operator name, network signal strength, a network type, and uplink and downlink traffic arrows).

It should be noted that, in the foregoing method for dividing the AP into the modules, the AP is divided into the plurality of function modules through different operations. In actual application, the AP can further include more or fewer modules. Persons in the art may understand that, the technical solution and the terminal device for advancing time at which PS is attached and optimizing reading of the SIM card to shorten a time for establishing a data connection shall both fall within the protection scope of the embodiment of the present invention. Correspondingly, FIG. 4A and FIG. 4B are another signaling interaction diagram of establishing a data connection according to an embodiment of the present invention. As shown in FIG. 4A and FIG. 4B, a method provided in this embodiment includes the following steps.

Step 401: A RIL sends a network searching instruction to a CP.

Before step 401 is performed, the method includes: receiving, by an AP, a switch-on instruction sent by a user.

Figure 5:
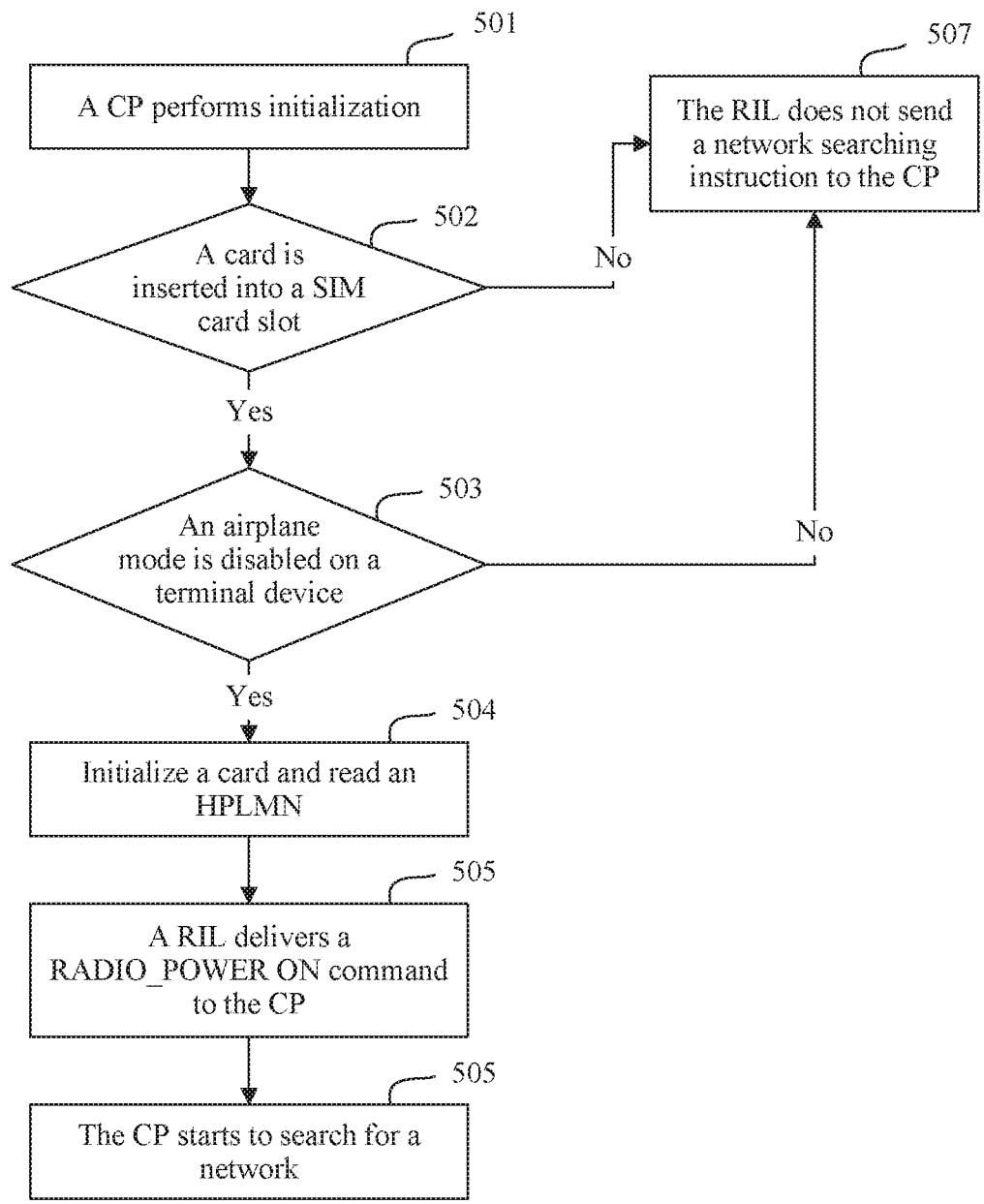
FIG. 5 is a schematic diagram of starting, by a CP, a network searching procedure according to an embodiment of the present invention.

It should be noted that, when the RIL sends the network searching command to the CP in advance, a card needs to be inserted into a SIM card slot of a terminal device and the terminal device is not in an airplane mode. Moreover, after initialization is completed, a home public land mobile network (Home Public Land Mobile Network, HPLMN) of a SIM card is read. To be specific, an MCC and an MNC of the SIM card can be normally obtained. The RIL can determine, based on information that is stored by the terminal device before last power-off and that indicates whether the terminal device is in an airplane mode, whether the terminal device is in an airplane mode. The RIL can directly read information about the SIM card. In addition, in another possible implementation, the CP reports the information about the SIM card to the RIL, and the RIL can determine, based on the information about the SIM card reported by the CP, that the PLMN of the SIM card can be normally obtained. Specifically, a schematic diagram of starting, by a CP, a network searching procedure is shown in FIG. 5, and the procedure includes the following steps.

Step 501: The CP performs initialization.

Step 502: The RIL determines whether a card is inserted into the SIM card slot. Specifically, if a card is inserted into the SIM card slot, step 503 is performed; otherwise, step 507 is performed.

Step 503: The RIL determines whether an airplane mode is disabled on the terminal device. Specifically, if the airplane mode is disabled, step 504 is performed; otherwise, step 507 is performed.

Step 504: The RIL determines that the MCC and the MNC of the SIM card can be obtained.

Step 505: The RIL delivers the network searching instruction to the CP. The network searching instruction sent by the RIL to the CP is a RADIO_POWER ON command.

Step 506: The CP starts to search for a network.

Step 507: The RIL does not send the network searching instruction to the CP. It indicates that if no card is inserted into the SIM card slot or if the airplane mode is enabled on the terminal device, the RIL does not send the network searching instruction to the CP in advance, and waits for another module of the AP to subsequently trigger the RIL to send a network searching instruction to the CP.

It should be noted that the network searching instruction can also be referred to as a radio power-on command.

Step 402: The CP starts to search for a network.

Specifically, after receiving the power-on command RADIO_POWER ON, the CP can start the network searching procedure. The CP searches for a network, and registers a data service and a voice service with the found network based on the information about the SIM card.

Step 403: An initialization module sends, to the RIL, an instruction for establishing a data connection between the AP and the CP.

The RIL establishes a data connection between the AP and the CP.

Step 404: The CP reports SIM card status change information and radio status information to the AP.

The SIM card status change information is UNSOL_RESPONSE_SIM_STATUS_CHANGED, and the information is a command word reported by the CP in an unsolicited manner, and does not carry specific information. The information indicates that the AP can send, to the CP, an instruction for querying information about a SIM card.

The radio status information indicates whether the CP has started to search for a network. The radio status information includes the following two cases.

In the prior art, after the terminal device receives the switch-on instruction, first, the initialization module sends, to the RIL, the instruction for establishing a data connection between the AP and the CP. Then, the CP reports the SIM card status change information and the radio status information to the AP. In this case, if the radio status information is a UNSOL_RESPONSE_RADIO_STATE_CHANGED RADIO_OFF command, the CP has not received a network searching instruction. To be specific, the CP has not started to search for a network. Then, the AP determines that the current terminal device is not in an airplane mode, and a card is inserted into the SIM card slot, the AP sends a network searching instruction RADIO_ON to the CP, and the CP searches for a network and performs registration.

In this embodiment of the present invention, after the terminal device receives the switch-on instruction, first, the RIL sends the network searching instruction to the CP, and the CP searches for a network and performs registration. Then, the CP reports the SIM card status change information and the radio status information to the AP. In this case, if the radio status information received by the AP is a UNSOL_RESPONSE_RADIO_STATE_CHANGED_RADIO_ON command, the CP has received a network searching instruction: To be specific, the CP has started to search for a network. The AP no longer sends a network searching instruction to the CP, but performs an operation, such as querying the information about the SIM card or querying network registration information.

Step 405: The CP reports network status change information to the AP.

The network status change information is UNSOL_RESPONSE_VOICE_NETWORK_STATE_CHANGED, and the information is a command word reported by the CP in an unsolicited manner, and does not carry specific information. The information indicates that the AP can send, to the CP, an instruction for querying the network registration information.

Step 406: A card module sends, to the CP, an instruction for querying the information about the SIM card.

It should be noted that the card module sends, by using the RIL, the instruction for querying the information about the SIM card, and then the RIL forwards the query instruction to the CP. For simplification, the figure does not show a process in which the RIL forwards, to the CP, the instruction for querying the information about the SIM card. However, persons skilled in the art should understand the process. Likewise, instructions sent between the AP and the CP in FIG. 4A and FIG. 4B are all forwarded by using the RIL. Persons in the art should be capable of learning, based on instruction information received by the RIL module in FIG. 4A and FIG. 4B, that the RIL correspondingly forwards information received by the RIL. This is not shown in FIG. 4A and FIG. 4B, and does not constitute any limitation on this embodiment of the present invention. No special descriptions are provided below any longer.

Specifically, after receiving the SIM card status change message, the card module queries the information about the SIM card in an unsolicited manner.

The instruction sent by the AP for querying the information about the SIM card is:
>GET_SIM_STATUS
<GET_SIM_STATUS IccCardState {CARDSTATE_PRESENT, PINSTATE_UNKNOWN, num_apps=1, gsm_id=0{APPTYPE_USIM, APPSTAFE_READY, pin1=RINSTATE_DISABLED, pin2=PINSTATE_UNKNOWN}, cdma_id=8, ims_id=8}

Step 407: A network status module sends, to the CP, an instruction for querying network registration information. Specifically, after receiving the network status change message, the network status module queries the current network registration information in an unsolicited manner.

An instruction sent by the AP for querying a data service registration status is:
>DATA_REGISTRATION_STATE
<DATA_REGISTRATION_STATE {1, 183d, 929f0b, 14, 2, 9608971, 360, 6205, 2}

An instruction sent by the AP for querying a voice service registration status is:
>VOICE_REGISTRATION_STATE
<VOICE_REGISTRATION_STATE {1, 183d, 929f1b, 14, 2, 2}

Step 408: The CP returns the information about the SIM card to the AP.

Specifically, the information about the SIM card includes the MCC and the MNC of the SIM card, and a serial number, a local phone number, a voice mailbox identifier, a call transfer identifier, and operator name information of the SIM card.

Step 409: The CP returns the network registration information to the AP.

Specifically, the network registration information includes information, such as a registration status of PS and a registration status of CS (in service/out of service/emergency calls only/airplane mode), a registration network type (2G, 3G, 4G, or the like), a roaming status, a registration network name (China Mobile, China Unicorn, China Telecom, or the like), and a network searching mode (automatic network searching/manual network searching).

Specifically, the CP returns the current information about the SIM card and the current network registration information by using the RIL.

Step 410: The card module reads information about the MCC and the MNC from the information about the SIM card.

Step 411: The card module notifies a data module that the data module can create an APN based on the MCC and the MNC of the SIM card.

Specifically, the card module reads the serial number, the local phone number, the voice mailbox identifier, the call transfer identifier, and the operator name information of the SIM card and that are in the SIM card without waiting to complete reading of the information about the SIM card, and at the same time, notifies the data module that the data module can create the APN based on the MCC and the MNC of the SIM card. In addition, the card module reads the serial number, the local phone number, the voice mailbox identifier, the call transfer identifier, and the operator name information of the SIM card and that are in the SIM card.

Step 412: The network status module determines that PS has been attached.

Specifically, the network status module determines, based on "the PS is in service" displayed in network status information, that the PS has been attached.

It should be noted that verifying whether the PS is attached is a preparatory condition of initiating a data connection by the terminal. When it is determined that the PS has been attached, the terminal device can initiate a data connection to the network based on the APN.

Step 413: The network status module sends, to the data module, information that the PS has been attached.

It should be noted that an execution sequence of step 410 to step 413 may not be limited to the foregoing form, and the actions of the card module and the actions of the network status module may be performed simultaneously. In other words, reading, by the card module, the information about the SIM card and reading, by the network status module, the network registration information may be independently performed.

In addition, the creating, by the data module, an APN based on the MCC and the MNC and the obtaining, by the AP, the serial number, the local phone number, the voice mailbox identifier, the call transfer identifier, and the operator name information of the SIM card and that are in the SIM card are performed in parallel, thereby advancing time at which an APN is created.

Step 414: The data module sends a data connection establishment instruction to the CP.

Figure 6:
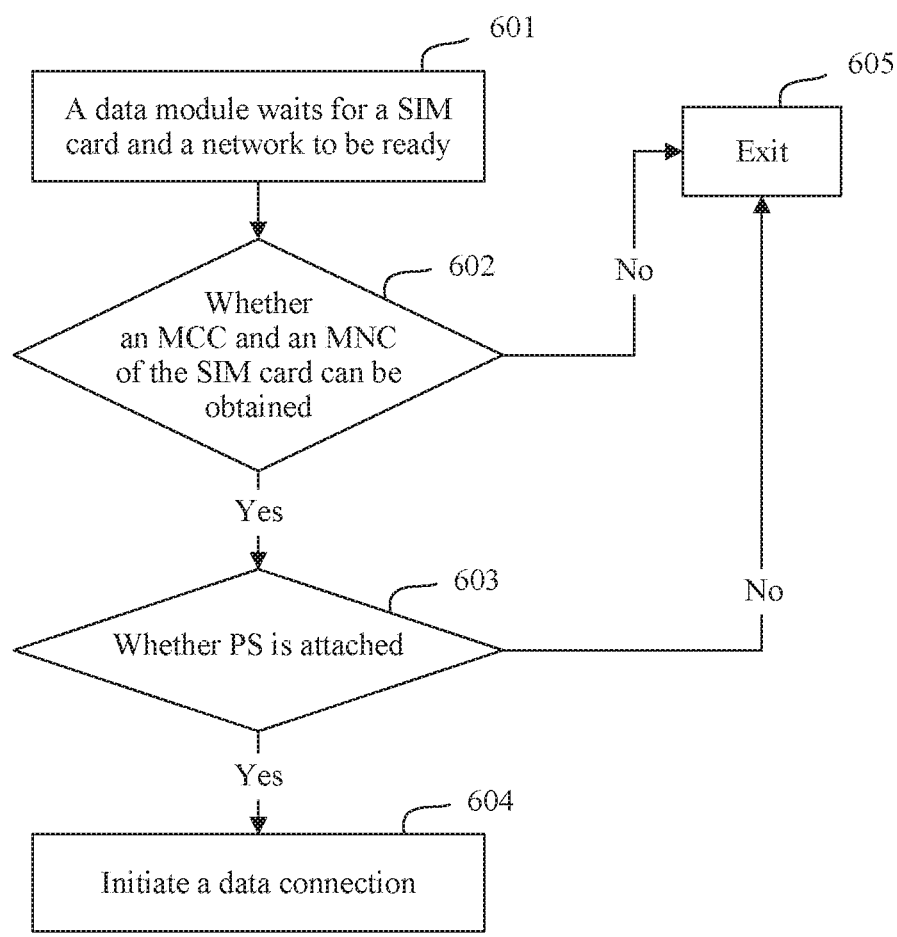
FIG. 6 is a schematic flowchart of determining, by a data module, to establish a data connection according to an embodiment of the present invention.

Specifically, a process in which the data module establishes a data connection has two preconditions: The information about the MCC and the MNC of the SIM card can be obtained, and the APN is created based on the MCC and the MNC and the PS is attached. That the PS has been attached may also be understood as a network ready ready state. A procedure in which the data module determines to establish a data connection is shown in FIG. 6, and specifically includes the following steps.

Step 601: The data module waits for the SIM card and the network to be ready.

That the data module waits for a SIM card and a network to be ready is: The data module determines, based on information fed back by the card module and the network status module, that the MCC and the MNC of the SIM card can be obtained and that the PS is attached. For details, refer to descriptions in step 602 and step 603.

Step 602: The data module determines whether the MNC and the MCC of the SIM card can be obtained. When the card module notifies the data module that the data module can create a data connection based on the MCC and the MNC of the SIM card, the data module determines that the MCC and the MNC can be obtained, and the data module creates the APN based on the MCC and the MNC, and performs step 603; otherwise, performs step 605.

Step 603: The data module determines whether the PS is attached. The network status module determines, based on the network registration information, whether the PS is attached. When the network status module sends, to the data module, information that the PS has been attached, the data module determines that the PS has been attached, and performs step 604; otherwise, performs step 605.

Step 604: The data module instructs the CP to initiate a data connection to the network.

The data module instructs the CP to initiate a data connection to the network based on the APN.

Step 605: The data module exits and waits. It indicates that when information about the MCC and the MNC of the SIM card cannot be obtained or when the PS is not attached, the data module does not initiate a data connection. Data connection creation quality is sent to the CP until the MCC can be obtained and the APN is created based on the MCC and the MNC, and it is determined that the PS is attached.

Specifically, the data module waits for the SIM card and the network to be ready, and then establishes a data connection. To be specific, the CP is instructed to establish a data connection to the network based on the APN.

It should be noted that, in this embodiment of the present invention, the AP can create the APN based on the MCC and the MNC without waiting to complete reading all information about the SIM card, thereby advancing time at which an APN is created. A speed of reading the card is optimized, and time at which PS is attached and time at which an APN is created are advanced, thereby shortening a time for creating a data connection, and finally reducing a time for waiting for establishment of the data service by a user on the whole.

Step 415: The CP returns, to the AP, information indicating that a network data service is available.

Specifically, when the data service is available, to be specific, a data connection is successfully established, the CP returns information such as a network interface name, an Internet Protocol (Internet Protocol, IP) address, a domain name system (Domain Name System, DNS), and a gateway to the AP to indicate that the data service is available. When the data service is unavailable, to be specific, establishment of a data connection fails, the CP reports an error to the AP.

Step 416: The status display module displays a network registration status.

Specifically, after a data connection is established, the status display module displays a network-related status to a user. For example, the status display module displays network information, such as an operator name, network signal strength, a network type, and uplink and downlink traffic arrows.

According to the terminal device and the data connection establishment method that are provided in this embodiment of the present invention, when reading the card, the card module in the AP does not need to wait to complete reading of all the records of the SIM card. As long as reading of the MCC and the MNC of the SIM card is completed, the data module can be notified that the data module can create the APN based on the MCC and the MNC of the card, thereby advancing time at which an APN is created. The network status module needs to wait for the PS to be attached, and then notifies the data module that the data module can initiate a data connection. The AP notifies the CP to initiate a data connection based on the APN. Because the CP is powered on in advance and starts to search for a network, time at which PS is attached is advanced. In this embodiment of the present invention, two conditions of establishing a data connection for the terminal device are optimized, and a data connection can be initiated in advance, thereby greatly shortening a time for the user to use the data service.

It may be understood that one of the two solutions for shortening a time for waiting for establishment of a data connection that are provided in this embodiment of the present invention can be selected and performed. A condition of sending the data connection creation instruction by the AP is completing creation of the APN and determining that the PS is attached. Therefore, as long as at least one condition of advancing time at which an APN is created or advancing time at which PS is attached is met, initiation of a data connection is advanced, and a time for a user to use the data service is shortened.

Figure 7:
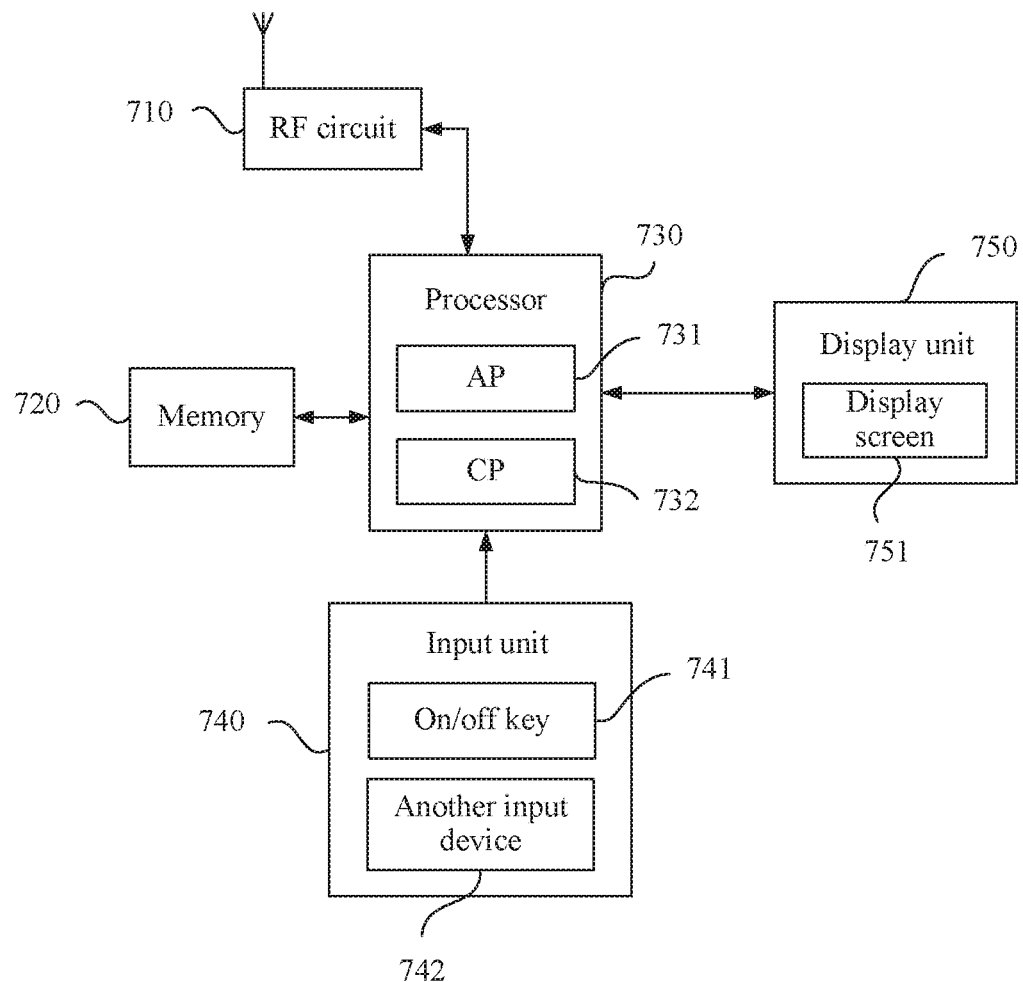
FIG. 7 is a schematic architectural diagram of another terminal device according to an embodiment of the present invention.

Correspondingly, FIG. 7 is another terminal device according to an embodiment of the present invention. Referring to FIG. 7, the terminal device provided in this embodiment of the present invention includes: a radio frequency (Radio Frequency, RF) circuit 710, a memory 720, a processor 730, an input unit 740, and a display unit 750. Persons skilled in the art may understand that a structure of the terminal device shown in FIG. 7 does not constitute a limitation on the terminal device, and may include components more or fewer than those shown in the figure, or may combine some components, or may have a different component arrangement.

The processor 730 includes two parts: an AP 731 and a CP 732. The AP 731 is connected to the CP 732 by using a communications bus. A RIL is a software interface establishing communication between the AP 731 and the CP 732. It should be noted that the AP and the CP are integrated into the processor 730 in FIG. 7. In another embodiment of the present invention, each of the AP and the CP may also function as an independent processor. Specifically, functions of components in FIG. 7 are described below in detail.

The RF circuit 710 may be configured to receive and send information, for example, exchange information with a network, and send the received information to the processor 730 for processing. Usually, the RF circuit 710 includes but is not limited to, an antenna, at least one amplifier, a transceiver, a coupler, a low noise amplifier (Low Noise Amplifier, LNA), a duplexer, and the like. In addition, the RF circuit 710 may further communicate with a network and another device through wireless communication. The wireless communication may use any communications standard or protocol, including but not limited to, a Global System for Mobile Communications (Global System of Mobile Communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Messaging Service, SMS), and the like.

The memory 720 may be configured to store a program instruction. The AP 731 and the CP 732 run the program instruction stored in the memory 720, so that the terminal performs the methods for establishing a data connection shown in FIG. 1 to FIG. 6. The memory 720 may mainly include a program storage area and a data storage area. The program storage area can store an operating system, an application program required for implementing the data connection establishment method, and the like. In addition, the memory 720 may include a volatile memory (volatile memory), such as a random-access memory (random-access memory, RAM). Alternatively, the memory 720 may include a non-volatile memory (non-volatile memory), such as a read-only memory (read-only memory, ROM), a flash memory (flash memory), a hard disk (hard disk drive, HDD), or a solid-state drive (solid-state drive, SSD). The memory 720 may further include a combination of the foregoing types of memories.

The processor 730 is a control center of the terminal device, is connected to all parts of the entire terminal by using various interfaces and lines. By running or executing a software program and/or a module stored in the memory 720 and by invoking data stored in the memory 720, the processor 730 performs the methods for establishing a data connection shown in FIG. 1 to FIG. 6. Optionally, the processor 730 may include one or more processing units. As shown in FIG. 7, the application processor AP 731 and the communications processor CP 732 may be integrated into the processor 730. The AP 731 mainly processes an operating system, a user interface, an application program, and the like. The CP 732 mainly processes wireless communication and interaction with a SIM card. It may be understood that the CP 732 may alternatively not be integrated into the processor 730.

The input unit 740 may be configured to receive digital or character information entered by a user, including a switch-on instruction and the like. Specifically, the input unit 740 may include an on/off key 741 and another input device 742. The on/off key 741 is configured to: receive a pressing operation that is performed by the user on the on/off key 741, and feed back the pressing operation of the user to a corresponding connection apparatus driven by a preset program. The pressing operation is converted into a switch-on instruction by using the connection apparatus, and the switch-on instruction is sent to the processor 730. Alternatively, the on/off key 741 directly uses the pressing operation of the user as a switch-on instruction and feeds back the switch-on instruction to the processor 730. The input unit 740 may further include the another input device 742. Specifically, the another input device 742 may include but is not limited to, one or more of a touch panel, a physical keyboard, a volume control key, a trackball, a mouse, a joystick, and the like.

The display unit 750 may be configured to display information entered by the user or information provided to the user. The display unit 750 may include a display screen 751. Optionally, the display screen 751 may be configured in a form of a liquid crystal display (Liquid Crystal Display, LCD), an organic light-emitting diode (Organic Light-Emitting Diode, OLED), or the like.

Although not shown, the terminal device may further include a wireless fidelity (wireless fidelity, WiFi) module, a camera, a Bluetooth module, a power supply, and the like. Details are not described herein.

In a specific example, the AP 731 receives the switch-on instruction by using the on/off key 741. The AP 731 sends a network searching instruction to the CP 732. The CP 732 searches for a network based on the network searching instruction. The AP 731 receives SIM card status change information and network status change information that are sent by the CP 732. The AP 731 sends a data connection establishment instruction to the CP 732 based on the SIM card status change information and the network status change information. The CP 732 establishes a data connection to the found network.

In addition, a network status is displayed by using the display screen 751. For example, network information, such as an operator name, network signal strength, a network type, and uplink and downlink traffic arrows, is displayed on the top of the display screen 751.

It should be noted that, in this embodiment of the present invention, the network searching instruction is sent to the CP 732 in advance, so that time at which PS is attached is advanced, and a time for establishing a data connection is shortened.

Optionally, the CP 732 registers a data service PS with the found network based on the network searching instruction and information about a subscriber identity module SIM card, and when the PS is successfully registered, the PS of the CP 732 is attached. The AP 731 sends the data connection establishment instruction to the CP 732 based on the SIM card status change information and the network status change information, determines, based on the network status change information, that the PS of the CP 732 is attached, and sends the data connection establishment instruction to the CP 732 based on an MCC and an MNC. The CP 732 establishes a data connection to the found network based on the data connection establishment instruction.

Optionally, the AP 731 receives radio status information sent by the CP 732, where the radio status information is used to indicate that the CP 732 has started to search for a network.

Optionally, the AP 731 sends, to the CP 732 based on the SIM card status change information, an instruction for querying the information about the SIM card, receives the information about the SIM card sent by the CP 732, and obtains the MCC and the MNC of the SIM card from the information about the SIM card.

Optionally, the AP 731 sends, to the CP 732 based on the network status change information, an instruction for querying network registration information, receives the network registration information returned by the CP 732, and determines, based on the network registration information, that the PS of the CP 732 is attached.

Optionally, the AP 731 obtains, from the information about the SIM card, a serial number, a local phone number, a voice mailbox identifier, a call transfer identifier, and operator name information of the SIM card. The AP 731 is specifically configured to create an access point name APN based on the MCC and the MNC, so that the CP 732 establishes a data connection to the found network based on the APN. The obtaining, by the AP 731 from the information about the SIM card, a serial number, a local phone number, a voice mailbox identifier, a call transfer identifier, and operator name information of the SIM card and the creating, by the AP 731, an APN based on the MCC and the MNC are performed in parallel.

It should be noted that the obtaining, by the AP from the information about the SIM card, a serial number, a local phone number, a voice mailbox identifier, a call transfer identifier, and operator name information of the SIM card and the obtaining, by the AP, an APN based on the MCC and the MNC are performed in parallel, thereby advancing time at which an APN is created. In addition, in this embodiment of the present invention, time at which PS is attached is advanced, a time for waiting for creation of a data connection is further shortened, and user experience is improved.

Correspondingly, an embodiment of the present invention provides another terminal device. For an architectural diagram of the terminal device provided in this embodiment, refer to FIG. 7. Details are not described herein.

In another specific example, a CP receives a network searching instruction. The CP searches for a network based on the network searching instruction. The CP sends SIM card status change information and network status change information to an AP. The AP sends a data connection establishment instruction to the CP based on the SIM card status change information and the network status change information. The CP establishes a data connection to the found network based on the data connection establishment instruction.

Optionally, after the CP searches for a network, the CP further sends radio status information to the AP, where the radio status information is used to indicate that the CP has started to search for a network.

Correspondingly, an embodiment of the present invention provides still another terminal device. For an architectural diagram of the terminal device provided in this embodiment, refer to FIG. 7. Details are not described herein.

In still another specific example, an AP receives a switch-on instruction by using an on/off key. The AP obtains a mobile country code MCC and a mobile network code MNC of a subscriber identity module SIM card from information about the SIM card. The AP obtains, from the information about the SIM card, a serial number, a local phone number, a voice mailbox identifier, a call transfer identifier, and operator name information of the SIM card. The AP creates an access point name APN based on the MCC and the MNC. The obtaining, by the AP from the information about the SIM card, a serial number, a local phone number, a voice mailbox identifier, a call transfer identifier, and operator name information of the SIM card and the creating, by the AP, an APN based on the MCC and the MNC are performed in parallel. The AP sends a data connection establishment instruction to the CP, so that the CP establishes a data connection to the found network based on the APN.

Optionally, after the application processor AP receives the switch-on instruction, the AP sends a network searching instruction to the CP, where the network searching instruction is used to instruct the CP to search for a network, and receives SIM card status change information and network status change information that are sent by the CP. The AP sends, to the CP based on the SIM card status change information, an instruction for querying the information about the SIM card. The AP receives the information about the SIM card sent by the CP. The AP obtains the MCC and the MNC of the SIM card from the information about the SIM card. The AP is specifically configured to send the data connection establishment instruction to the CP after determining, based on the network status change information, that the CP successfully registers a data service PS.

It should be noted that the terminal device provided in this embodiment of the present invention may include more or fewer virtual or physical modules, so as to implement the data connection establishment method shown in FIG. 2A and FIG. 2B or FIG. 3. This embodiment of the present invention provides only several possible examples, and does not limit the protection scope of the present invention.

For the data connection establishment method and the terminal device that are provided in the embodiments of the present invention, time at which PS is attached is advanced, thereby shortening a time for establishing a data connection, and reducing a waiting time of a user. In addition, in the embodiments of the present invention, further, time at which an APN is created is advanced. Therefore, the time for establishing the data connection is further shortened, a time for the user to use the data service is greatly shortened, and user experience is improved.

Persons skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

Persons of ordinary skill in the art may understand that all or a part of the steps in each of the foregoing method of the embodiments may be implemented by a program instructing a processor. The foregoing program may be stored in a computer readable storage medium. The storage medium may be a non-transitory (English: non-transitory) medium, such as a random-access memory, a read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely example specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A data connection establishment method performed by an application processor (AP) of a terminal device, wherein the data connection establishment method comprises:
   receiving a switch-on instruction to start up the AP;
   sending, in response to receiving the switch-on instruction to start up the AP, a network searching instruction to a communications processor (CP) of the terminal device, wherein the network searching instruction instructs the CP to search for a network and instructs the CP to register a Packet Switched (PS) data service with a found network, and wherein the network searching instruction is sent without the AP waiting for the CP to report subscriber identification module (SIM) card status change information and network status change information to the AP;
   receiving the SIM card status change information and the network status change information from the CP after sending the network searching instruction, wherein the SIM card status change information informs the AP that the AP can send the CP an instruction for querying information about a SIM card inserted in the terminal device;
   determining, in response to receiving the SIM card status change information, a mobile country code (MCC) and a mobile network code (MNC) of the SIM card;
   determining, based on the network status change information, that the CP successfully registered the PS data service responsive to the network searching instruction; and
   sending a data connection establishment instruction to the CP based on the MCC and the MNC, wherein the data connection establishment instruction instructs the CP to establish a data connection to the found network.

2. The data connection establishment method of claim 1, wherein the network searching instruction is sent without the AP waiting for the CP to report radio status information to the AP, and wherein the radio status information indicates that the CP has started to search for the network.

3. The data connection establishment method of claim 2, wherein after sending the network searching instruction to the CP, the data connection establishment method further comprises receiving the radio status information from the CP.

4. The data connection establishment method of claim 3, wherein determining the MCC and the MNC of the SIM card comprises:
   sending, to the CP responsive to receiving the SIM card status change information, the instruction for querying the information about the SIM card;
   receiving the information about the SIM card from the CP; and
   obtaining the MCC and the MNC of the SIM card from the information about the SIM card.

5. The data connection establishment method of claim 4, further comprising obtaining, from the information about the SIM card, a serial number, a local phone number, a voice mailbox identifier, a call transfer identifier, and operator name information of the SIM card, wherein sending the data connection establishment instruction to the CP comprises creating an access point name (APN) based on the MCC and the MNC such that the CP establishes the data connection to the found network based on the APN, and wherein obtaining the serial number, the local phone number, the voice mailbox identifier, the call transfer identifier, and the operator name information of the SIM card and creating the APN based on the MCC and the MNC are performed in parallel.

6. The data connection establishment method of claim 2, wherein determining the MCC and MNC of the SIM card comprises:
  sending, to the CP responsive to receiving the SIM card status change information, the instruction for querying the information about the SIM card;
  receiving the information about the SIM card from the CP; and
  obtaining the MCC and the MNC of the SIM card from the information about the SIM card.

7. The data connection establishment method of claim 1, wherein determining that the data service of the CP is attached comprises:
  sending, to the CP based on the network status change information, an instruction for querying network registration information;
  receiving the network registration information from the CP; and
  determining, based on the network registration information, that the data service of the CP is attached.

8. The data connection establishment method of claim 1, wherein the CP successfully registers the PS data service before the AP sends the data connection establishment instruction to the CP.

9. The data connection establishment method of claim 1, wherein the AP is a first processor device, wherein the CP is a second processor device that is distinct from the first processor device, wherein the AP processes an operating system, a user interface, and an application program, and wherein the CP processes wireless communication and interaction with the SIM card.

10. A terminal device, comprising:
  a communications bus;
  a communications processor (CP); and
  an application processor (AP) coupled to the CP using the communications bus and configured to:
    receive a switch-on instruction to start up the AP;
    send, in response to receiving the switch-on instruction to start up the AP, a network searching instruction to the CP, wherein the CP is configured to search for a network based on the network searching instruction and to register a Packet Switched (PS) data service with a found network based on the network searching instruction, and wherein the network searching instruction is sent without the AP waiting for the CP to report subscriber identification module (SIM) card status change information and network status change information to the AP;
    receive the SIM card status change information and the network status change information from the CP after sending the network searching instruction, wherein the SIM card status change information informs the AP that the AP can send the CP an instruction for querying information about a SIM card inserted in the terminal device;
    determine, in response to receiving the SIM card status change information, a mobile country code (MCC) and a mobile network code (MNC) of the SIM card;
    determine, based on the network status change information, that the CP successfully registers the PS data service; and
    send a data connection establishment instruction to the CP based on the MCC and the MNC,
  wherein the CP is configured to establish a data connection to the found network based on the data connection establishment instruction.

11. The terminal device of claim 10, wherein the network searching instruction is sent without the AP waiting for the CP to report radio status information to the AP, and wherein the radio status information indicates that the CP has started to search for the network.

12. The terminal device of claim 11, wherein the AP is further configured to receive the radio status information from the CP.

13. The terminal device of claim 12, wherein the AP is further configured to:
  send, to the CP responsive to receiving the SIM card status change information, the instruction for querying the information about the SIM card;
  receive the information about the SIM card from the CP; and
  obtain the MCC and the MNC of the SIM card from the information about the SIM card.

14. The terminal device of claim 13, wherein the AP is further configured to:
  obtain, from the information about the SIM card, a serial number, a local phone number, a voice mailbox identifier, a call transfer identifier, and operator name information of the SIM card; and
  create an access point name (APN) based on the MCC and the MNC such that the CP establishes the data connection to the found network based on the APN, wherein obtaining the serial number, the local phone number, the voice mailbox identifier, the call transfer identifier, and the operator name information of the SIM card and creating the APN based on the MCC and the MNC are performed in parallel.

15. The terminal device of claim 11, wherein the AP is further configured to:
  send, to the CP responsive to receiving the SIM card status change information, the instruction for querying the information about the SIM card;
  receive the information about the SIM card from the CP; and
  obtain the MCC and the MNC of the SIM card from the information about the SIM card.

16. The terminal device of claim 10, wherein the AP is further configured to:
  send, to the CP based on the network status change information, an instruction for querying network registration information;
  receive the network registration information from the CP; and
  determine, based on the network registration information, that the data service of the CP is attached.

17. The terminal device of claim 10, wherein the CP successfully registers the PS data service before the AP sends the data connection establishment instruction to the CP.

18. A terminal device, comprising:
a communications bus;
a communications processor (CP); and
an application processor (AP) coupled to the CP using the communications bus and configured to:
- receive a switch-on instruction to start up the AP;
- send, in response to receiving the switch-on instruction to start up the AP, a network searching instruction to the CP, wherein the networking searching instruction instructs the CP to search for a network and instructs the CP to register a Packet Switched (PS) data service with a found network, and wherein the network searching instruction is sent without the AP waiting for the CP to report subscriber identity module (SIM) card status change information and network status change information to the AP;
- receive the SIM card status change information from the CP after sending the network searching instruction to the CP, wherein the SIM card status change information is used to inform the AP that the AP can send the CP an instruction for querying information about a SIM card inserted in the terminal device;
- obtain, in response to receiving the SIM card status change information and from the CP, the information about the SIM card;
- obtain a mobile country code (MCC) and a mobile network code (MNC) of the SIM card from the information about the SIM card;
- obtain, from the information about the SIM card, a serial number, a local phone number, a voice mailbox identifier, a call transfer identifier, and operator name information of the SIM card;
- create, in parallel with the obtaining, an access point name (APN) based on the MCC and the MNC; and
- send a data connection establishment instruction to the CP such that the CP establishes a data connection to the found network based on the APN.

19. The terminal device of claim 18, wherein after the AP receives the switch-on instruction, the AP is further configured to:
- receive the network status change information from the CP;
- send, to the CP in response to receiving the SIM card status change information, the instruction for querying the information about the SIM card; and
- send the data connection establishment instruction to the CP after determining, based on the network status change information, that the CP successfully registered a Packet Switched (PS) data service.

20. The terminal device of claim 18, wherein the CP successfully registers a Packet Switched (PS) data service before the AP sends the data connection establishment instruction to the CP.

\* \* \* \* \*